United States Patent
Alper et al.

(10) Patent No.: US 8,494,487 B2
(45) Date of Patent: Jul. 23, 2013

(54) METHOD AND APPARATUS FOR AUTHENTICATING MOBILE TERMINAL ON HANDOVER

(75) Inventors: Yegin Alper, San Jose, CA (US); Boung-Joon Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1110 days.

(21) Appl. No.: 11/594,901

(22) Filed: Nov. 9, 2006

(65) Prior Publication Data

US 2007/0213033 A1 Sep. 13, 2007

Related U.S. Application Data

(60) Provisional application No. 60/781,410, filed on Mar. 10, 2006.

(30) Foreign Application Priority Data

Jun. 28, 2006 (KR) .................. 10-2006-0058530

(51) Int. Cl.
*H04M 1/66* (2006.01)
(52) U.S. Cl.
USPC ........................................ 455/411
(58) Field of Classification Search
USPC ............. 455/411, 432.1, 410, 433; 380/270, 380/279; 713/168, 169, 151, 171; 726/1, 726/4, 7, 10; 370/352, 331, 338, 279
See application file for complete search history.

(56) References Cited

U.S. PATENT DOCUMENTS

| | | | |
|---|---|---|---|
| 2004/0077335 A1* | 4/2004 | Lee et al. | 455/410 |
| 2005/0113094 A1 | 5/2005 | Dumser et al. | |
| 2005/0143065 A1* | 6/2005 | Pathan et al. | 455/432.1 |
| 2005/0163078 A1 | 7/2005 | Oba et al. | |
| 2005/0210251 A1* | 9/2005 | Nyberg et al. | 713/169 |
| 2005/0254653 A1* | 11/2005 | Potashnik et al. | 380/270 |
| 2006/0041931 A1* | 2/2006 | Boxall et al. | 726/4 |
| 2006/0179307 A1* | 8/2006 | Stieglitz et al. | 713/168 |

FOREIGN PATENT DOCUMENTS

| | | |
|---|---|---|
| EP | 1 526 752 | 8/2005 |
| JP | 2004-266331 | 9/2004 |
| KR | 2005-50205 | 5/2005 |
| WO | WO 2004/112347 | 12/2004 |

OTHER PUBLICATIONS

Kim,Mal-Hui_translation_KR_pub.num.10-2005-0050205_pub. dat.2005-05-31.pdf.*

* cited by examiner

*Primary Examiner* — Kwasi Karikari
*Assistant Examiner* — Alexander Yi
(74) *Attorney, Agent, or Firm* — NSIP Law

(57) ABSTRACT

A method and apparatus for authenticating a mobile terminal are provided. A list of potential Network Access Servers (NASs) corresponding to a NAS are maintained in a backend authentication server, authorization information corresponding to each of the potential NASs is transmitted, from the backend authentication server to each of the potential NASs, when the mobile terminal is authenticated via the NAS. The mobile terminal detects whether a new NAS is pre-authenticated, when the mobile terminal moves to a domain of the new NAS, the new NAS detects whether the mobile terminal is pre-authenticated, and the new NAS authenticates the mobile terminal via a Pre-Shared Key (PSK) method, when the mobile terminal and the new NAS are pre-authenticated.

29 Claims, 6 Drawing Sheets

FIG. 3

| SERVING NAS | POTENTIAL NASs |
|---|---|
| NAS1 | NAS2 , NAS3 |
| NAS2 | NAS1 , NAS3 , NAS4 |
| ..... | ..... |
| ..... | ..... |

METHOD AND APPARATUS FOR AUTHENTICATING MOBILE TERMINAL ON HANDOVER

CROSS-REFERENCE TO RELATED APPLICATIONS

This application claims the benefit under 35 U.S.C. §119 (e) of a U.S. Provisional Application No. 60/781,410, filed on Mar. 10, 2006, in the U.S. Patent and Trademark Office, and under 35 U.S.C. § 119(a) of a Korean Patent Application No. 10-2006-0058530, filed on Jun. 28, 2006, in the Korean Intellectual Property Office, the entire disclosures of which are hereby incorporated by reference.

BACKGROUND OF THE INVENTION

1. Field of the Invention

The present invention relates to a method and system for authenticating a mobile terminal. More particularly, the present invention relates to a method and system for effectively authenticating a mobile terminal when the mobile terminal performs a handover.

2. Description of Related Art

A mobile terminal must perform a full authentication procedure which involves multiple round-trips to a remote home Authentication, Authorization, and Accounting (AAA) server via a NAS. This process is performed according to a conventional art, every time a mobile terminal (MT) moves to a domain of another Network Access Server (NAS). The authentication procedures of the mobile terminal, which are performed upon handover, increase handover latency.

Latest network access authentication protocols, for example, Protocol for carrying Authentication for Network Access (PANA) and World Interoperability for Microwave Access (WiMAX), among others, have already optimized intra-NAS mobility. No additional authentication with the home AAA server is required once the mobile terminal is authenticated by the NAS. As long as the MT performs handover to another access node, for example, a base station, under the same NAS, no additional authentication with the home AAA server will be required.

Accordingly, efforts to optimize the intra-NAS mobility are being made. Also, according to another conventional art, a new NAS obtains session keys from a previous NAS to quickly authenticate the mobile terminal. The present scheme requires inter-NAS business relation and security association, which cannot be guaranteed for all circumstances. For example, it is difficult to exchange a session key corresponding to security information between NASs which are operated by different operators.

Also, another scheme is that the mobile terminal performs an authentication procedure with potential target NASs. In the present scheme, the mobile terminal must be familiar with the potential target NASs. Also, since a specific protocol, PANA, must be utilized, cost of over-the-air signaling is increased.

Accordingly, there is a need for an improved system and method for reducing handover latency by eliminating a necessity for information exchange between a backend authentication server and a NAS which authenticate a mobile terminal over a long period of time.

SUMMARY OF THE INVENTION

An aspect of an exemplary embodiment of the present invention is to address at least the above problems and/or disadvantages and to provide at least the advantages described below. Accordingly, an aspect of exemplary embodiments of the present invention is to reduce handover latency by eliminating a necessity for information exchange between a backend authentication server and a NAS which require a relatively long period of time to authenticate a mobile terminal, upon the handover of the mobile terminal, in a conventional art.

Another aspect of an exemplary embodiment of the present invention also provides a method of authenticating a mobile terminal. The mobile terminal is authenticated by the exchange of information between the mobile terminal and a NAS when the mobile terminal performs handover.

According to another aspect of an exemplary embodiment of the present invention, a method of authenticating a mobile terminal, which can optimize an authentication procedure upon handover, while a new NAS does not receive authentication information from a previous NAS is provided.

An aspect of an exemplary embodiment of the present invention also provides a method of mobile terminal authentication, which can optimize an authentication procedure upon handover, while the mobile terminal does not predict potential target NASs or require a specific protocol, such as PANA.

According to an aspect of an exemplary embodiment of the present invention, a method of authenticating a mobile terminal includes 1) maintaining a list of potential NASs corresponding to a NAS in a backend authentication server, 2) transmitting authorization information corresponding to each of the potential NASs, from the backend authentication server to each of the potential NASs, when the mobile terminal is authenticated via the NAS, 3) the mobile terminal detecting whether a new NAS is pre-authenticated, when the mobile terminal moves to a domain of the new NAS, 4) the new NAS detecting whether the mobile terminal is pre-authenticated, and 5) the new NAS authenticating the mobile terminal via a Pre-Shared Key (PSK) method, when the mobile terminal and the new NAS are pre-authenticated.

According to another aspect of an exemplary embodiment of the present invention, a method of authenticating a mobile terminal in a NAS includes 1) receiving authorization information corresponding to the NAS from a backend authentication server, 2) detecting whether the mobile terminal is pre-authenticated, when the mobile terminal moves to a domain of the NAS, and 3) authenticating the mobile terminal via a PSK method using the authorization information.

According to still another aspect of an exemplary embodiment of the present invention, a method of supporting an authentication of a mobile terminal in a backend authentication server includes 1) maintaining a list of potential NASs corresponding to a NAS, 2) selecting a potential target NAS from the potential NASs corresponding to the NAS, when the mobile terminal is authenticated via the NAS, 3) generating authorization information corresponding to the potential target NAS, and 4) transmitting the authorization information the corresponding potential target NAS.

According to yet another aspect of an exemplary embodiment of the present invention, a method of authenticating a mobile terminal includes 1) detecting whether a new NAS is pre-authenticated, when the mobile terminal moves to a domain of the new NAS, 2) calculating an MSK of the new NAS according to a predetermined formula, and 3) receiving an authentication from the new NAS via a PSK method using the MSK.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features, and advantages of certain exemplary embodiments of the present invention will be more apparent from the following description, taken in conjunction with the accompanying drawings, in which:

FIG. 3 illustrates a list of potential NASs which are maintained in a backend authentication server according to an exemplary embodiment of the present invention;

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
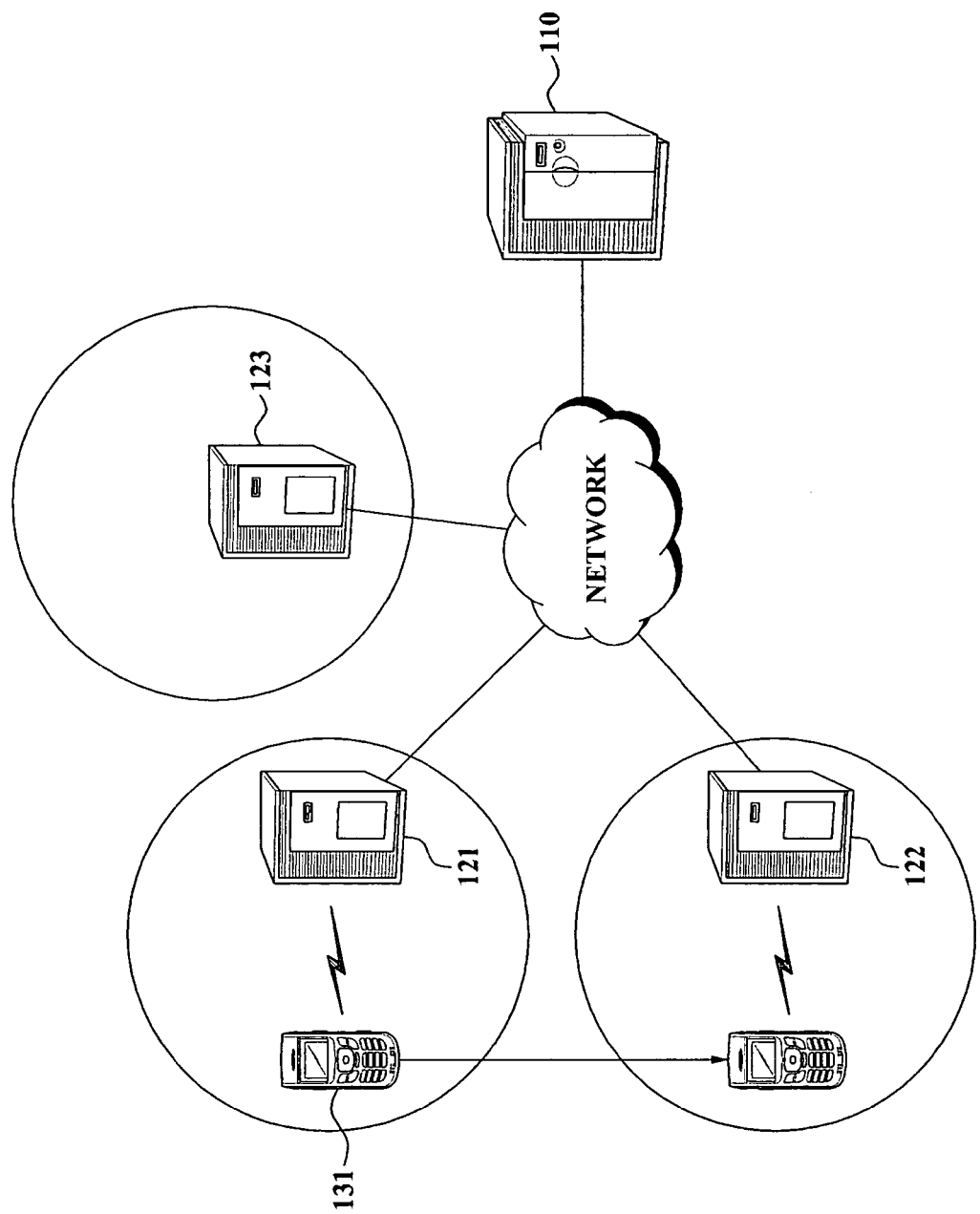
FIG. 1 is a diagram illustrating a backend authentication server, a NAS, and a mobile terminal according to an exemplary embodiment of the present invention.

FIG. 1 is a diagram illustrating a backend authentication server, a NAS, and a mobile terminal according to an exemplary embodiment of the present invention.

A backend authentication server 110 provides an authentication service to a mobile terminal (MT) 131. The backend authentication server 110 operates according to Extensible Authentication Protocol (EAP), which is described in RFC 3748 of the International Engineering Task Force (IETF), the entire disclosure of which is hereby incorporated by reference. Also, the backend authentication server 110 is referred to as an Authentication, Authorization, and Accounting (AAA) server.

Each of the NASs 121 and 122 functions as an access control point for remote users connecting to a company's internal network or to an Internet service provider (ISP). For example, each of the NASs 121 and 122 may be a switch or an access point.

The mobile terminal 131 is a user terminal that comprises communication capability and mobility. For example, the mobile terminal 131 may be a mobile phone, a personal digital assistant (PDA), and a notebook computer, among others. Referring to FIG. 1, as the mobile terminal 131 moves from a domain of the NAS 121 to a domain of the NAS 122, a handover occurs. According to an exemplary implementation, the NAS 122, corresponding to a new NAS, must authenticate the mobile terminal 131 before allowing the mobile terminal 131 to gain access to the network.

Figure 2:
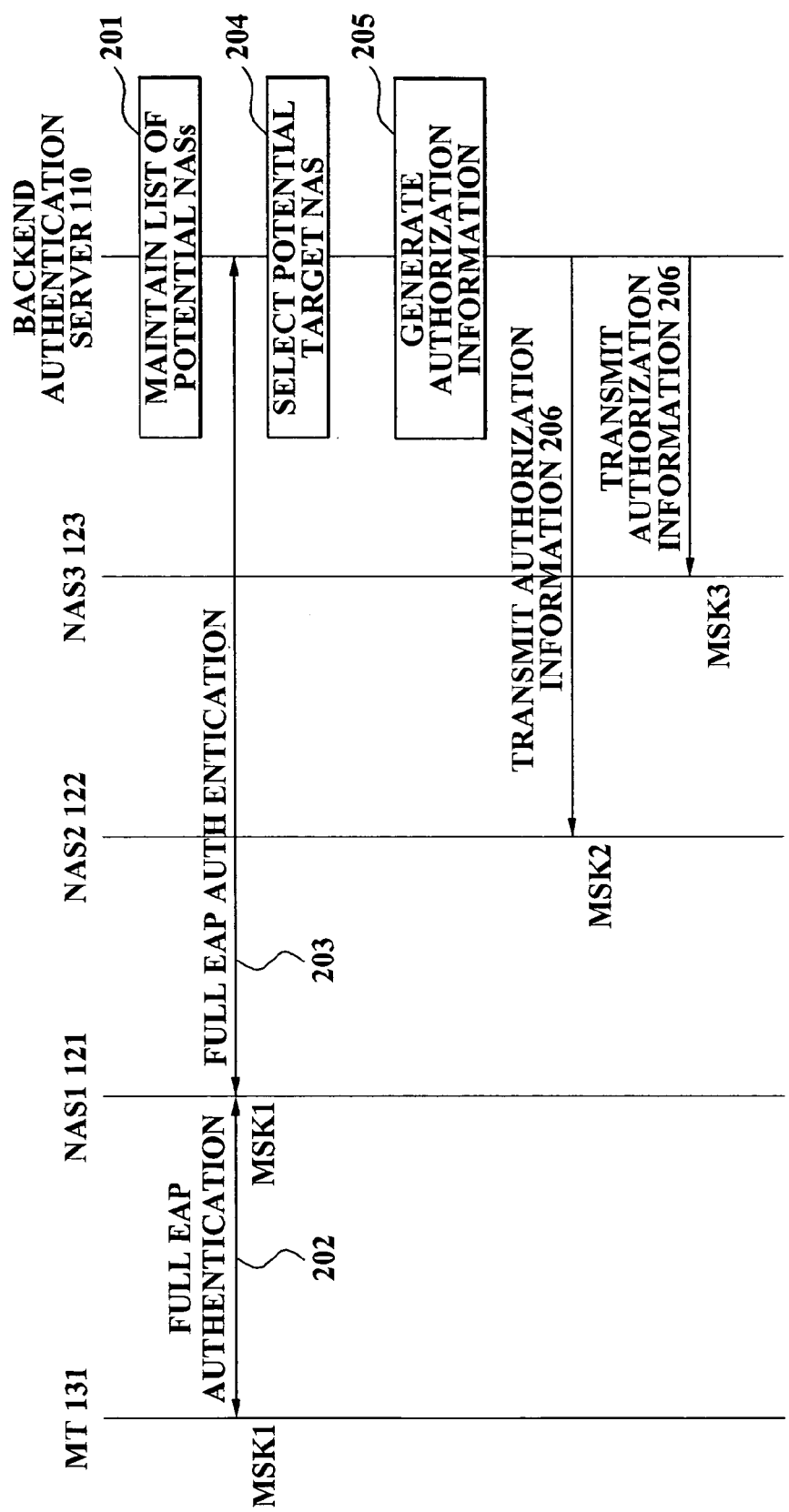
FIG. 2 is a diagram illustrating a method of authenticating a mobile terminal according to an exemplary embodiment of the present invention.

FIG. 2 is a diagram illustrating a method of authenticating a mobile terminal according to an exemplary embodiment of the present invention.

In step 201, the backend authentication server 110 maintains a list of potential NASs corresponding to a NAS. The potential NASs, corresponding to the NAS, are NASs that can be a next NAS of the mobile terminal 131 when the mobile terminal 131 moves.

The list of the potential NASs corresponding to the NAS comprises a NAS identifier of each of the potential NASs. According to an exemplary embodiment of the present invention, the list of the potential NASs corresponding to the NAS further comprises a network access identifier (NAI) of each of the potential NASs or an Internet Protocol (IP) address of each of the potential NASs. Also, according to another exemplary embodiment of the present invention, the NAI of each of the potential NASs or the IP address of each of the potential NASs may be utilized as the NAS identifier.

FIG. 3 illustrates a list of potential NASs which are maintained in a backend authentication server according to an exemplary embodiment of the present invention. Referring to FIG. 3, when a currently serving NAS of a mobile terminal is NAS1, and the mobile terminal moves to a domain of another NAS, NASs that can be a next NAS of the mobile terminal are NAS2 and NAS3. Also, when the currently serving NAS of the mobile terminal is NAS2, and the mobile terminal moves to a domain of another NAS, the NASs that can be the next NAS of the mobile terminal are NAS1, NAS3, and NAS4 in FIG. 3.

Also, when the currently serving NAS of the mobile terminal is NAS1, a possible next NAS of the mobile terminal may be pre-configured by using geographic location information of the NAS1. When the mobile terminal moves, a new NAS must be a NAS of a neighbor domain of the previously serving NAS domain. Accordingly, the list of potential NASs may be generated by using the above-described feature. When NASs of the neighbor domain of the domain of the NAS1 are only NAS2 and NAS3, and in this state, the NAS1 moves, the next NAS must be between the NAS2 and the NAS3. When the list of potential NASs is generated by using geographical location information of the NASs, the list becomes static information. As described above, when using the geographical location information of the NAS, the list of potential NASs corresponding to the NAS may be easily configured.

In steps 202 and 203, the mobile terminal 131 is authenticated by the backend authentication server 110 via the NAS (NAS1) 121. When the mobile terminal 131 does not move, but initially establishes a link with a predetermined NAS, for example, when the mobile terminal 131 is powered-up, the mobile terminal 131 must be authenticated by the backend authentication server 110 via the NAS of the domain which includes the mobile terminal 131. In an exemplary implementation, the NAS that the mobile terminal 131 initially establishes the link with is the NAS 121. Steps 202 and 203 may be performed by an identical method to EAP which is described in RFC 3748 of the IETF. Specifically, since a full EAP authentication is performed in steps 202 and 203, some information exchange may be required between the backend authentication server 110 and the NAS 121.

The backend authentication server 110 generates a master session key (MSK) 1 during the authentication. The (MSK) 1 is an MSK with respect to the NAS 121. The MSK is a keying material that is derived between an EAP peer and an EAP server, and exported by an EAP method. In an exemplary implementation, the mobile terminal 131 corresponds to the EAP peer, and the backend authentication server 110 corresponds to the EAP server. Also, the MSK is at least 64 octets in length. The backend authentication server 110 transports the generated MSK1 to the NAS 121. During an EAP authentication, the mobile terminal 131 calculates the MSK1 with respect to the NAS 121 according to a procedure of EAP.

When the mobile terminal 131 is authenticated via the NAS 121 in steps 202 and 203, the backend authentication server 110 selects a potential target NAS from the potential NASs corresponding to the NAS 121.

According to an exemplary embodiment of the present invention, the backend authentication server 110 selects all of the potential NASs as the potential target NAS. For example, referring to FIG. 3, the potential NASs of the NAS 121 are the NAS (NAS2) 122, and the NAS (NAS3) 123. In an exemplary implementation, the backend authentication server 110 selects the NAS 122 and the NAS 123 as the potential target NAS. The exemplary embodiment of the present invention may be easily configured, including, all NASs that the mobile terminal 131 may move to may be selected as the potential target NAS.

According to another exemplary embodiment of the present invention, the backend authentication server 110 selects the potential target NAS based on the geographical location information of the NAS and the potential NASs. For example, in FIG. 3, the potential NASs of the NAS (NAS1) 121 are the NAS (NAS2) 122 and the NAS (NAS3) 123. However, when it is unlikely or least likely that the mobile terminal 131 moves from the domain of the NAS 121 to the domain of the NAS 123 based on the geographical location information of the NAS 121, the NAS 122, and the NAS 123, the backend authentication server 110 selects only the NAS 122 as the potential target NAS. If a river forms a boundary between the NAS 121 and the NAS 123 without a transportation system to facilitate crossing the river, the backend authentication server 110 may only select the NAS 122 as the potential target NAS even when the domain of the NAS 121 and the domain of the NAS are adjacent to each other. Also, when it is likely that the mobile terminal 131 moves to both the domain of the NAS 122 and the domain of the NAS 123, the backend authentication server 110 selects the NAS 122 and the NAS 123 as the potential target NASs.

According to another exemplary embodiment of the present invention, the backend authentication server 110 selects the potential target NAS based on statistical information regarding the mobility of the mobile terminal 131. For example, when the mobile terminal 131 is located in the domain of the NAS 121, and a NAS of the next domain is the NAS 122 based on the statistical information regarding the mobility of the mobile terminal 131, the backend authentication server 110 selects only the NAS 122 as the potential target NAS, excluding the NAS 123. Also, when it may be likely that the mobile terminal 131 moves to the domain of the NAS 123 based on the statistical information regarding the mobility of the mobile terminal 131, the NAS 123 is included in the potential target NAS.

In step 205, the backend authentication server 110 generates authorization information corresponding to the potential target NAS. The authorization information corresponding to the potential target NAS includes an MSK corresponding to the potential target NAS. When the NAS 122 and the NAS 123 are selected as the potential target NAS in step 204, the backend authentication server 110 generates an MSK2 corresponding to the NAS 122, and an MSK3 corresponding to the NAS 123, respectively.

In an exemplary implementation, the MSK corresponding to the potential target NAS is generated by, $$MSKi = PRF(EMSKcurrent, ID\_{NAS}i) \quad \text{[Equation 1]}$$

According to an exemplary implementation, MSKi designates the MSK corresponding to the potential target NAS, and the EMSK current designates an extended MSK which is obtained by the backend authentication server from a full EAP authentication with the NAS. In an exemplary implementation, EMSK current corresponds to the extended MSK which is obtained by the backend authentication server 110 from the full EAP authentication with the NAS 121. An extended master session key (EMSK) generation method of RFC 3748 may be utilized for generating an EMSK according to exemplary embodiments of the present invention.

ID_NASi designates an identifier of the potential target NAS. An NAI or an IP address may be utilized for the identifier of the NAS. Also, the identifier of the potential target NAS is a value which is stored in the list of the potential NASs maintained in the backend authentication server 110.

PRF designates a pseudo-random function. PRF, which is described in RFC 3839 of the IETF, may be utilized, but exemplary embodiments of the present invention are not limited thereto.

In step 206, the backend authentication server 110 transmits the authorization information to the corresponding potential target NAS. In this case, the backend authentication server 110 transmits the MSK2 to the NAS 122, and the MSK3 to the MAS 123 respectively.

Figure 4:
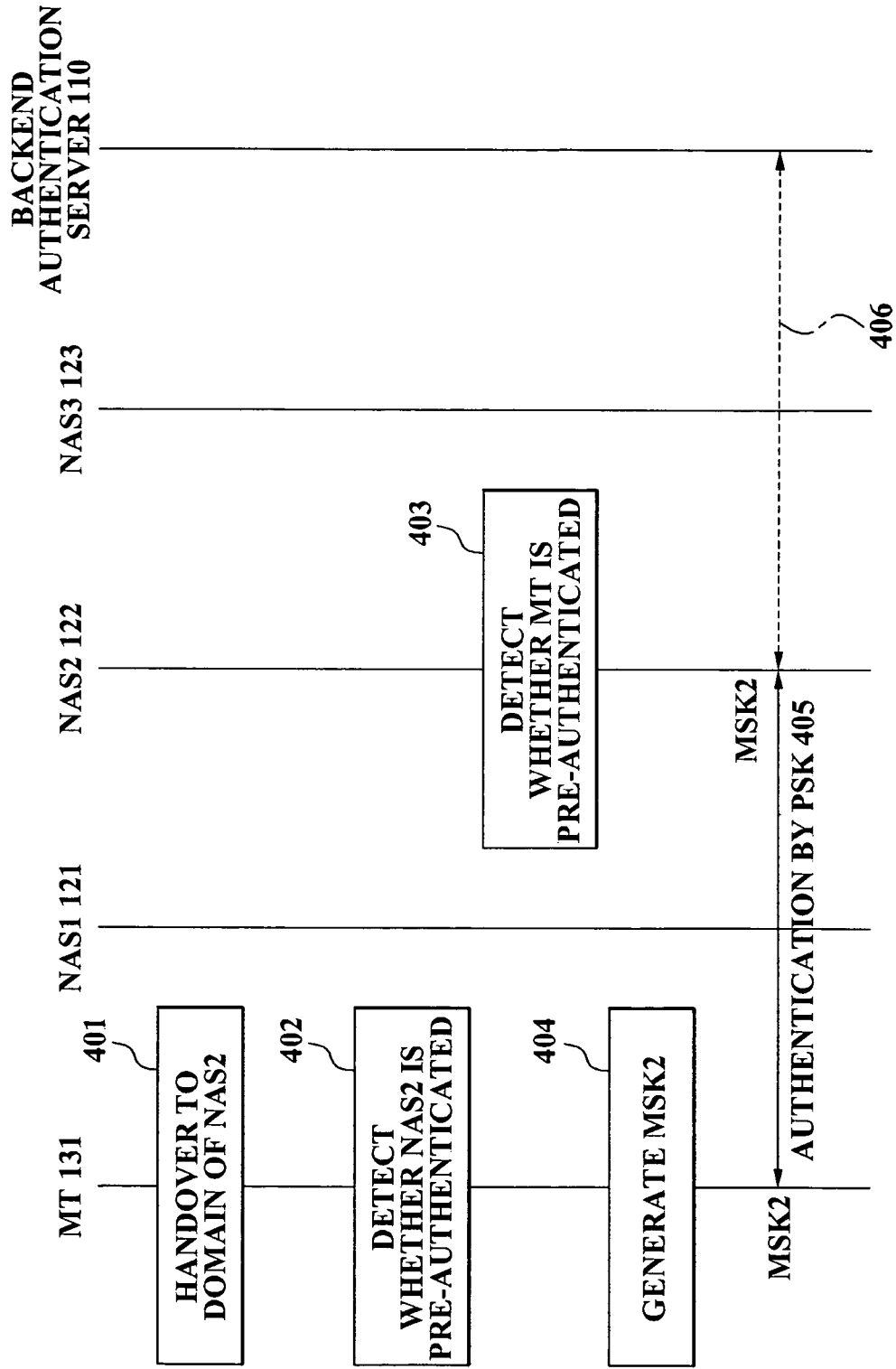
FIG. 4 is a diagram illustrating a method of performing the method shown in FIG. 2.

FIG. 4 is a diagram illustrating a method of performing the method shown in FIG. 2.

In step 401, the mobile terminal 131 moves to the domain of the NAS 122 corresponding to the new NAS, and performs a handover to the NAS 122.

In step 402, when the handover to the domain of the new NAS occurs, the mobile terminal detects whether the new NAS is pre-authenticated. In an exemplary implementation, the mobile terminal 131 detects whether the NAS 122 is pre-authenticated. According to an exemplary embodiment of the present invention, three schemes are suggested to facilitate the mobile terminal's 131 ability to detect pre-authentication of the new NAS. These schemes will be described later with reference to FIG. 5.

In step 403, the new NAS (NAS2) 122, detects whether the mobile terminal 131 is pre-authenticated. According to an exemplary implementation, the new NAS 122 receives first pre-authentication information regarding a pre-authenticated mobile terminal from the backend authentication server 110. When the authorization information is transmitted to the potential target NAS in step 206 of FIG. 2, the backend authentication server 110 may transmit the first pre-authentication information regarding the pre-authenticated mobile terminal to the potential target NAS. When the mobile terminal 131 connects with the new NAS 122, the mobile terminal 131 transmits second pre-authentication information to the new NAS 122. In this case, the new NAS 122 compares the first pre-authentication information and the second pre-authentication information, and determines that the mobile terminal 131 is pre-authenticated. A method of detecting, in the new NAS 122, whether the additionally connected mobile terminal 131 is pre-authenticated will be described in detail with reference to FIG. 6.

In step 404, the mobile terminal 131 calculates the MSK2 with respect to the new NAS 122 according to a predetermined formula. During an EAP exchange process with the new NAS 122, the mobile terminal 131 calculates the MSK2 by using an EAP method. The predetermined formula may utilize equation 2 below. In an exemplary implementation, equation 2 is substantially identical to equation 1 described above. While equation 1 is utilized when the backend authentication server 110 generates the MSK, equation 2 is utilized when the mobile terminal 131 generates the MSK. Accordingly, a description related to each variable may be different, which will be described below.

$$MSKi = PRF(EMSKcurrent, ID\_{NAS}i) \quad \text{[Equation 2]}$$

According to an exemplary implementation, MSKi designates the MSK corresponding to the new NAS. In an exemplary implementation, MSKi designates the MSK2 with respect to the NAS 122.

The EMSK current designates an extended MSK which is obtained by the mobile terminal from a full EAP authentication with a previously serving NAS before a handover of the mobile terminal. In an exemplary implementation, the EMSK current corresponds to the extended MSK which is obtained by the mobile terminal 131 from the full EAP authentication with the previously serving NAS 121 before the handover of the mobile terminal 131 to the NAS 122, in step 202. An EMSK generation method of RFC 3748 may be utilized for generating an EMSK according to an exemplary embodiment of the present invention.

ID_NASi designates an identifier of the new NAS. An NAI or an IP address may be utilized for the identifier of the NAS. Also, when connecting with the new NAS 122 and performing an EAP exchange with the new NAS 122, the mobile terminal 131 obtains a NAS identifier of the new NAS 122. For example, the mobile terminal 131 may obtain the NAS identifier of the new NAS 122 via an EAP request/identity message using an identity selection hints mechanism for EAP of RFC 4282.

PRF designates a pseudo-random function. PRF, which is described in RFC 3839 of the IETF, may be utilized, but exemplary embodiments of the present invention are not limited thereto.

When both the mobile terminal 131 and the new NAS 122 are determined to be pre-authenticated in steps 402 and 403, the mobile terminal 131 and the new NAS 122, are engaged in a Pre-Shared Key (PSK)-based method.

In step 405, when the mobile terminal 131 and the new NAS 122 are pre-authenticated, the new NAS 122 authenticates the mobile terminal 131 by a PSK method. A PSK of the PSK method is the mater session key (MSK2) with respect to the new NAS 122. According to an exemplary implementation, when the new NAS 122 authenticates the additionally connected mobile terminal 131, the backend authentications server 110 is excluded, in step 406. According to an exemplary embodiment of the present invention, since the new NAS 122 holds a PSK, the authentication of the mobile terminal 131 must be terminated in the new NAS 122. In other words, the NAS may single-handedly authenticate the mobile terminal 131 without relaying the authentication to the backend authentication server 110. As described above, according to an exemplary embodiment of the present invention, since the authentication of the mobile terminal 131 may be terminated in a network access device when the mobile terminal 131 performs a handover, the handover may be expeditiously handled.

In an exemplary implementation, the new NAS 122 receives the MSK2 from the backend authentication server 110. According to an exemplary implementation, the MSK2 is included in the authorization information that the new NAS 122 receives from the backend authentication server 110 (see step 206). Also, the mobile terminal 131 calculates the MSK2 with respect to the new NAS 122 according to equation 2 (see step 404).

Hereinafter, three schemes suggested for the mobile terminal 131 to detect whether the new NAS 122 is pre-authenticated according to an exemplary embodiment of the present invention will be described.

Figure 5:
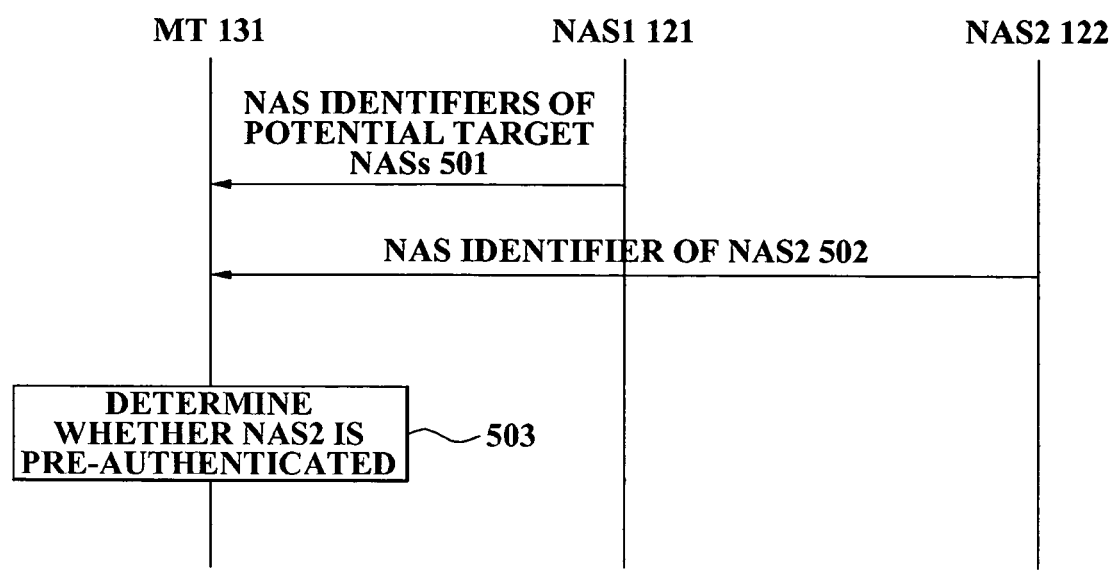
FIG. 5 is a method of detecting in a mobile terminal whether a new NAS is pre-authenticated according to an exemplary embodiment of the present invention.

A first scheme will be described with reference to FIG. 5. FIG. 5 is a method of detecting in a mobile terminal whether a new NAS is pre-authenticated according to an exemplary embodiment of the present invention.

In step 501, the previously serving NAS 121 of the mobile terminal 131 transmits a list to the mobile terminal 131. The list includes NAS identifiers of potential target NASs. Step 501 is performed when the mobile terminal 131 is located in the domain of the previously serving NAS 121. The NAS 121 transmits the list of the potential target NASs corresponding to the NAS 121 to the mobile terminal 131 at the end of a successful EAP authentication. The list of the potential target NASs includes NAS identifiers of the potential target NASs. The NAS 121 receives the list of the potential target NASs corresponding to the NAS 121 from the backend authentication server 110.

The mobile terminal 131 moves from the domain of the NAS 121 to the domain of the NAS 122, and performs an EAP exchange with the NAS 122 corresponding to the new NAS. According to an exemplary implementation, in step 502, the NAS 122 transmits the NAS identifier of the NAS 122 to the mobile terminal 131 via the EAP exchange.

In step 503, the mobile terminal 131 determines whether the NAS identifier of the new NAS 122 is included in the list. When the NAS identifier of the new NAS 122 is included in the list, the mobile terminal 131 determines that the new NAS 122 is pre-authenticated.

According to an exemplary implementation, a second scheme suggested for the mobile terminal 131 to detect whether the new NAS 122 is pre-authenticated will be described.

The mobile terminal 131 is provided with the list which includes the NAS identifiers of the potential target NASs. The list may be provided to the mobile terminal 131 by a manufacturer when the mobile terminal 131 is manufactured. The list may also be provided to the mobile terminal 131 by a seller at the time the mobile terminal 131 is sold, or in other points in time. Also, the list includes the NAS identifiers of the potential target NASs which are predetermined based on a geographical location where the mobile terminal 131 is used. For example, when the mobile terminal is sold in the Republic of Korea, the mobile terminal 131 may be initially provided with a list of all NASs which are located in the Republic of Korea.

The mobile terminal 131 moves from the domain of the NAS 121 to the domain of the NAS 122, and performs an EAP exchange with the NAS 122 corresponding to the new NAS. In this case, the mobile terminal 131 receives a NAS identifier of the new NAS 122 from the new NAS 122 via EAP The mobile terminal 131 determines whether the NAS identifier of the new NAS 122 is included in the list. When the NAS identifier of the new NAS 122 is included in the list, the mobile terminal 131 determines that the new NAS 122 is pre-authenticated.

According to an exemplary implementation, a third scheme suggested for the mobile terminal 131 to detect whether the new NAS 122 is pre-authenticated will be described.

The mobile terminal 131 moves from the domain of the NAS 121 to the domain of the NAS 122, and performs an EAP exchange with the NAS 122 corresponding to the new NAS. According to the third scheme, the mobile terminal 131 determines that the new NAS 122 is pre-authenticated when the new NAS 122 requires a predetermined EAP type. The predetermined EAP type may comprise EAP-PSK. For example, the mobile terminal 131 generally performs an EAP-Transport Layer Security (TLS) with the NAS, and in this state, when the new NAS 122 requires the mobile terminal 131 for EAP-PSK, the mobile terminal 131 determines that the new NAS 122 is pre-authenticated. Although the mobile terminal 131 may prefer another EAP method, the new NAS 122 forces the mobile terminal 131 to perform a PSK-based method, which indicates the infrastructure has a PSK that is most likely the outcome of a pre-authentication. The method is a very implicit scheme which is preferentially used in well-managed architectures and deployments.

Figure 6:
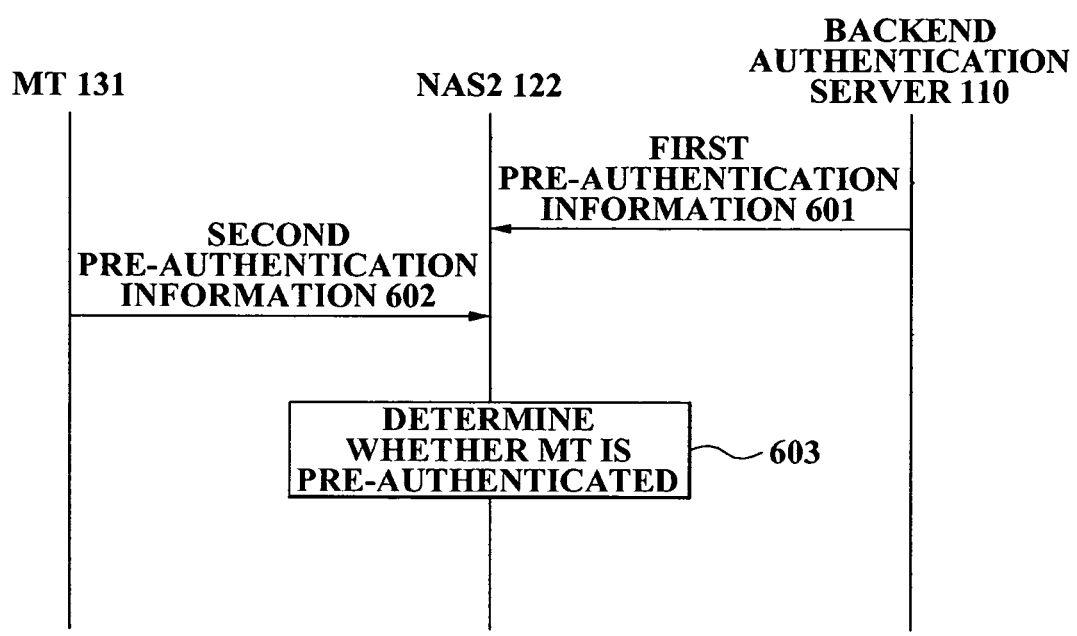
FIG. 6 is a diagram illustrating a method of detecting in a new NAS whether a mobile terminal is pre-authenticated according to an exemplary embodiment of the present invention.

FIG. 6 is a diagram illustrating a method of detecting, in a new NAS, whether a mobile terminal is pre-authenticated according to an exemplary embodiment of the present invention.

In step 601, the new NAS 122 receives first pre-authentication information about a pre-authenticated mobile terminal from the backend authentication server 110. The first pre-authentication information may include a terminal identifier of the pre-authenticated mobile terminal or a user identifier of a pre-authenticated user. Also, the user identifier of the pre-authenticated user may include an email address of the pre-authenticated user. For example, the first pre-authentication information may include the email address of the pre-authenticated user, for example, alper@abc.com, or pooh@abcd.com, among others.

In step 602, the mobile terminal 131 transmits second pre-authentication information to the new NAS 122. The second pre-authentication information may include a terminal identifier of the mobile terminal 131 or a user identifier of the terminal. When the mobile terminal 131 connects with the new NAS 122, the mobile terminal 131 presents the terminal identifier or the user identifier of the mobile terminal 131 to the new NAS 122. The new NAS 122 receives the second pre-authentication information via an EAP exchange with the mobile terminal 131. Specifically, the new NAS 122 receives the second pre-authentication information via a response packet of EAP from the mobile terminal 131.

In step 603, the new NAS 122 compares the first pre-authentication information and the second pre-authentication information. Also, when the first pre-authentication information and the second pre-authentication information are determined to match each other, the new NAS 122 determines that the mobile terminal 131 is pre-authenticated.

When the mobile terminal 131 connects with the new NAS 122, and presents the user identifier, for example alper@abcd.com, of the mobile terminal 131 to the new NAS 122 the new NAS 122 determines that the mobile terminal 131 is pre-authenticated. According to an exemplary implementation, when the user identifier, alper@abcd.com, is included in user identifiers of pre-authenticated users, the new NAS 122 determines that the mobile terminal 131 is pre-authenticated.

A pre-authentication can only be utilized during the lifetime of a full authentication. Accordingly, when the lifetime of a latest authentication expires, authorization information about the potential NASs must be purged to make the authorization information unavailable to an incoming mobile terminal.

The mobile terminal authenticating method according to the above-described exemplary embodiment of the present invention may be recorded in computer-readable media including program instructions to implement various operations embodied by a computer. The media may also include, alone or in combination with the program instructions, data files, and data structures, among others. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to an exemplary embodiment of the present invention, pre-authentication may be realized in the form of pre-provisioning potential target NASs with dynamic session keys that are derived from an earlier full authentication. The above-described operation facilitates authentication of a mobile terminal by exchanging information between the mobile terminal and a NAS, without an information exchange between the mobile terminal and a backend authentication server, upon a handover of the mobile terminal to a new NAS. According to an exemplary embodiment of the present invention, it is possible to reduce handover latency by eliminating a need for information exchange between a backend authentication server and a NAS which require a relatively long time period for authenticating a mobile terminal, upon the handover of the mobile terminal, in a conventional art.

Also, according to an exemplary embodiment of the present invention, since a communication between a mobile terminal and a NAS may be performed by using a standard EAP method, no protocol change is required for an over-the-air interface. Specifically, no specific protocol, such as PANA, is required. Accordingly, an exemplary embodiment of the present invention may be utilized for EAP-based mobile/wireless Internet architecture, such as WiFi, WiMAX, and 3GPP2, among others. Also, an exemplary embodiment of the present invention may be applied to other types of architectures.

Also, according to exemplary embodiments of the present invention, an inter-technology handover may be handled. For example, even when a mobile terminal connected with a wireless broadband Internet (WiBro) network moves to a neighboring WiFi network, a backend authentication server may pre-authenticate the mobile terminal.

Also, according to exemplary embodiments of the present invention, it is possible to optimize an authentication procedure upon a handover, while a new NAS does not receive authentication information from a previous NAS.

While the invention has shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of authenticating a mobile terminal, the method comprising:

maintaining a list of potential Network Access Servers (NASs) corresponding to a NAS in a backend authentication server;

transmitting authorization information corresponding to each of the potential NASs, from the backend authentication server to each of the potential NASs, when the mobile terminal is authenticated via the NAS, wherein the authorization information for each respective potential NAS comprises a master session key (MSK) for each respective potential NAS, each MSK being generated based on an extended MSK (EMSK) that is obtained by a full EAP authentication between the backend authentication server and a current NAS;

detecting by the mobile terminal whether a new NAS is pre-authenticated, when the mobile terminal moves to a domain of the new NAS; detecting by the mobile terminal whether a new NAS is pre-authenticated, when the mobile terminal moves to a domain of the new NAS;

detecting by the new NAS whether the mobile terminal is pre-authenticated; and performing an Extensible Authentication Protocol (EAP) authentication, by the new NAS, to authenticate the mobile terminal via a Pre-Shared Key (PSK) method, when the mobile terminal and the new NAS are pre-authenticated, without performing a full EAP authentication with the backend authentication server, wherein the detecting of whether the new NAS is pre-authenticated comprises transmitting a list of NAS identifiers of potential target NASs from the NAS to the mobile terminal, transmitting a NAS identifier of the new NAS from the new NAS to the mobile terminal via EAP, and determining in the mobile terminal that the new NAS is pre-authenticated, when the NAS identifier of the new NAS is comprised in the list.

2. The method of claim 1, wherein the potential NASs corresponding to the NAS are pre-configured by using geographical location information of the NAS.

3. The method of claim 1, further comprising:

transmitting first pre-authentication information about a pre-authenticated mobile terminal from the backend authentication server to the new NAS.

4. The method of claim 3, wherein the detecting of whether the mobile terminal is pre-authenticated comprises:

receiving second pre-authentication information from the mobile terminal;

comparing the first pre-authentication information and the second pre-authentication information; and determining that the mobile terminal is pre-authenticated, when the first pre-authentication information and the second pre-authentication information match each other.

5. A method of authenticating a mobile terminal in a potential NAs, the method comprising:

receiving authorization information corresponding to the potential NAS from a backend authentication server, the authorization information comprising a master session key (MSK) for the potential NAS, the MSK being generated based on an extended MSK (EMSK) that is obtained by a full Extensible Authentication Protocol (EAP) authentication between the backend authentication server and a current NAS;

detecting whether the mobile terminal is pre-authenticated, when the mobile terminal moves to a domain of the potential NAS;

performing an EAP authentication to authenticate the mobile terminal via a PSK method using the authorization information, without performing a full EAP authentication with the backend authentication server; and receiving first pre-authentication information about the pre-authenticated mobile terminal from the backend authentication server, wherein the detecting comprises; receiving second pre-authentication information from the mobile terminal, comparing the first pre-authentication information and the second pre-authentication information and determining that the mobile terminal is pre-authenticated, when the first pre-authentication information and the second pre-authentication information match each other.

6. The method of claim 5, wherein the first pre-authentication information comprises a user identifier of a pre-authenticated user, and the second pre-authentication information comprises a user identifier of a user of the mobile terminal.

7. The method of claim 5, wherein the first pre-authentication information comprises a terminal identifier of the pre-authenticated mobile terminal.

8. The method of claim 5, wherein the receiving of second pre-authentication information comprises receiving the second pre-authentication information via a response packet of EAP from the mobile terminal.

9. The method of claim 5, wherein a PSK of the PSK method comprises the MSK that the potential NAS receives from the backend authentication server, and the MSK is calculated by the mobile terminal according to a formula.

10. The method of claim 9, wherein the formula corresponds to MSKi=PRF(EMSKcurrent, ID_NASi), where MSKi designates the MSK corresponding to the potential NAS, EMSKcurrent designates an extended MSK which is obtained by the mobile terminal from a full EAP authentication with the current NAS before a handover of the mobile terminal, ID_NASi designates an identifier of the potential NAS, and PRF designates a pseudo-random function.

11. The method of claim 5, wherein the authenticating comprises authenticating the mobile terminal without intervention of the backend authentication server.

12. A method of authenticating a mobile terminal, the method comprising:

detecting whether a new NAS is pre-authenticated, when the mobile terminal moves to a domain of the new NAS; and receiving an authentication from the new NAS via a PSK method to perform an Extensible Authentication Protocol (EAP) authentication of the mobile terminal and the new NAS without performing a full EAP authentication with a backend authentication server, the authentication comprising a master session key (MSK) for the new NAS, the MSK being generated based on an extended MSK (EMSK) that is obtained by a full EAP authentication between the backend authentication server and a current NAS, wherein the detecting comprises: receiving a list, which comprises NAS identifiers of potential target NASs, from a previously serving NAS of the mobile terminal, receiving a NAS identifier of the new NAS from the new NAS via EAP and determining that the new NAS is pre-authenticated, when the NAS identifier of the new NAS is comprised in the list.

13. The method of claim 12, wherein the list comprises the NAS identifiers of the potential target NASs which are based on a geographical location of usage of the mobile terminal.

14. The method of claim 12, wherein the detecting comprises
determining that the new NAS is pre-authenticated when the new NAS requires an EAP type.

15. The method of claim 14, wherein the EAP type comprises EAP-PSK.

16. The method of claim 12, further comprising
transmitting pre-authentication information to the new NAS via a response packet of EAP.

17. The method of claim 16, wherein the pre-authentication information comprises a user identifier of a user of the mobile terminal.

18. The method of claim 12, wherein the MSK is determined according to MSKi=PRF(EMSKcurrent, ID_NASi),
where MSKi designates the MSK corresponding to the new NAS,
EMSKcurrent designates an extended MSK which is obtained by the mobile terminal from a full EAP authentication with the current NAS before a handover of the mobile terminal,
ID_NASi designates an identifier of the new NAS, and
PRF designates a pseudo-random function.

19. The method of claim 12, wherein a PSK of the PSK method comprises the MSK that the new NAS receives from the backend authentication server, and the MSK is calculated by the mobile terminal according to a second formula.

20. A non-transitory computer-readable recording medium having stored thereon instructions for implementing a method of authenticating a mobile terminal in a potential NAS, the method comprising:
receiving authorization information corresponding to the potential NAS from a backend authentication server, the authorization information comprising a master session key (MSK) for the potential NAS, the MSK being generated based on an extended MSK (EMSK) that is obtained by a full Extensible Authentication Protocol (EAP) authentication between the backend authentication server and a current NAS;
detecting whether the mobile terminal is pre-authenticated, when the mobile terminal moves to a domain of the potential NAS;
performing an EAP authentication, by the potential NAS, of the mobile terminal via a PSK method using the authorization method, without performing a full EAP authentication with the backend authentication server; and
receiving first pre-authentication information about the pre-authenticated mobile terminal from the backend authentication server;
wherein the detecting comprises: receiving second pre-authentication information from the mobile terminal, comparing the first pre-authentication information and the second pre-authentication information, and determining that the mobile terminal is pre-authenticated, when the first pre-authentication information and the second pre-authentication information match each other.

21. The computer-readable recording medium of claim 20, wherein the receiving second pre-authentication information comprises receiving the second pre-authentication information via a response packet of EAP from the mobile terminal.

22. The computer-readable recording medium of claim 20, wherein a PSK of the PSK method comprises the MSK that the potential NAS receives from the backend authentication server, and the MSK is calculated by the mobile terminal according to a formula.

23. The computer-readable recording medium of claim 22, wherein the formula corresponds to MSKi=PRF(EMSKcurrent, ID_NASi),
where MSKi designates the MSK corresponding to the potential NAS,
EMSKcurrent designates an extended MSK which is obtained by the mobile terminal from a full EAP authentication with the current NAS before a handover of the mobile terminal,
ID_NASi designates an identifier of the potential NAS, and
PRF designates a pseudo-random function.

24. A non-transitory computer-readable recording medium having stored thereon instructions for implementing a method of authenticating a mobile terminal, the method comprising:
detecting whether a new NAS is pre-authenticated, when the mobile terminal moves to a domain of the new NAS; and
receiving an authentication from the new NAS via a PSK method to perform an Extensible Authentication Protocol (EAP) authentication of the mobile terminal and the new NAS without performing a full EAP authentication with a backend authentication server, the authentication comprising a master session key (MSK) for the new NAS, the MSK being generated based on an extended MSK (EMSK) that is obtained by a full EAP authentication between the backend authentication server and a current NAS,
wherein the detecting comprises: receiving a list, which comprises NAS identifiers of potential target NASs, from a previously serving NAS of the mobile terminal, receiving a NAS identifier of the new NAS from the new NAS via EAP, and determining that the new NAS is pre-authenticated when the NAS identifier of the new NAS is comprised in the list.

25. The computer-readable recording medium of claim 24, wherein the list comprises the NAS identifiers of the potential target NASs which are predetermined based on a geographical location of usage of the mobile terminal.

26. The computer-readable recording medium of claim 24, wherein the detecting comprises
determining that the new NAS is pre-authenticated when the new NAS requires an EAP type.

27. The computer-readable recording medium of claim 26, wherein the EAP type comprises EAP-PSK.

28. The computer-readable recording medium of claim 24, further comprising
transmitting pre-authentication information to the new NAS via a response packet of EAP.

29. The computer-readable recording medium of claim 24, wherein a PSK of the PSK method comprises the MSK that the new NAS receives from the backend authentication server, and the MSK is calculated by the mobile terminal according to a second formula.

* * * * *

UNITED STATES PATENT AND TRADEMARK OFFICE
CERTIFICATE OF CORRECTION

| | | |
|---|---|---|
| PATENT NO. | : 8,494,487 B2 | Page 1 of 1 |
| APPLICATION NO. | : 11/594901 | |
| DATED | : July 23, 2013 | |
| INVENTOR(S) | : Yegin Alper and Byoung-Joon Lee | |

It is certified that error appears in the above-identified patent and that said Letters Patent is hereby corrected as shown below:

On the title page:

Item (75) Inventors, Replace "Boung-Joon Lee" with -- Byoung-Joon Lee --

Signed and Sealed this
Seventh Day of January, 2014

Margaret A. Focarino
*Commissioner for Patents of the United States Patent and Trademark Office*